US008744532B2

(12) United States Patent
Watson

(10) Patent No.: US 8,744,532 B2
(45) Date of Patent: Jun. 3, 2014

(54) SYSTEM AND METHOD FOR CUSTOMIZABLE PLAYBACK OF COMMUNICATION DEVICE ALERT MEDIA

(75) Inventor: Scott Watson, Marina Del Rey, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1139 days.

(21) Appl. No.: 12/291,474

(22) Filed: Nov. 10, 2008

(65) Prior Publication Data

US 2010/0120355 A1    May 13, 2010

(51) Int. Cl.
*H04M 1/00* (2006.01)
(52) U.S. Cl.
USPC ............ 455/567; 455/550.1; 455/552.1; 455/412.1; 455/413; 455/414.1; 455/90.1; 455/3.01; 455/556.2; 455/426.1
(58) Field of Classification Search
CPC  H04M 1/7255; H04M 1/72533; H04M 19/02
USPC ............ 455/550.1, 552.1, 90.1, 412.2, 412.1, 455/413, 414.1, 557, 3.06, 420; 725/37, 39, 725/60, 62; 381/101, 106; 700/94, 255, 700/184, 182, 187
See application file for complete search history.

(56) References Cited

U.S. PATENT DOCUMENTS

| | | | |
|---|---|---|---|
| 7,251,504 B2 * | 7/2007 | Lee et al. ................. | 455/566 |
| 7,929,059 B2 * | 4/2011 | Watson et al. ............. | 348/725 |
| 2002/0103552 A1 * | 8/2002 | Boucher et al. ............ | 700/94 |
| 2003/0122966 A1 * | 7/2003 | Markman et al. .......... | 348/563 |
| 2004/0006748 A1 * | 1/2004 | Srivastava et al. ......... | 715/530 |
| 2005/0165915 A1 * | 7/2005 | Hejna ........................ | 709/219 |
| 2007/0033419 A1 * | 2/2007 | Kocher et al. ............. | 713/193 |
| 2007/0116301 A1 * | 5/2007 | Suzuki ...................... | 381/106 |
| 2008/0046936 A1 * | 2/2008 | Dam et al. ................. | 725/88 |
| 2008/0183755 A1 * | 7/2008 | Zak .......................... | 707/104.1 |
| 2008/0188209 A1 * | 8/2008 | Dorogusker et al. ...... | 455/414.2 |
| 2009/0167542 A1 * | 7/2009 | Culbert et al. ............. | 340/635 |
| 2010/0062759 A1 * | 3/2010 | Sinton et al. .............. | 455/426.1 |

* cited by examiner

Primary Examiner — Ganiyu A Hanidu
(74) Attorney, Agent, or Firm — Farjami & Farjami LLP

(57) ABSTRACT

There is provided a device for alerting a user of an occurrence of an event. The device comprises a memory configured to store alert data and a media stream having a beginning and an end, the alert data designating a plurality of points for the media stream, the plurality of points including a start point and an end point after the start point, wherein at least one of the start point and the end point is different from the beginning and the end of the media stream. The device further comprises a processor configured to detect the occurrence of the event; retrieve the alert data from the memory in response to the occurrence of the event; begin playback of the media stream from the start point; and stop playback of the media stream at the end point.

11 Claims, 4 Drawing Sheets

SYSTEM AND METHOD FOR CUSTOMIZABLE PLAYBACK OF COMMUNICATION DEVICE ALERT MEDIA

BACKGROUND OF THE INVENTION

1. Field of the Invention

The present invention relates generally to electronic circuits and systems. More particularly, the present invention relates to media alert systems.

2. Background Art

Mobile phones and other devices are a ubiquitous part of modern life, allowing people to stay organized and connected with colleagues, family, and friends. Often, these devices alert the user to an event of interest by playback of some default audio preset, such as a simulated telephone ring noise to signal an incoming call, a beeping noise to signal an alarm timer, or a tone chime to indicate a new text message or voicemail. Video presets might also be used for a visual alert element, as modern phones with larger displays, faster processors and extended battery life gradually displace audio-only devices. These default alert presets, while functional and acceptable to some people, are often generic and lacking in flair. Users who wish to express their preferences and tastes will likely prefer to substitute different alert presets on topics that interest them.

In particular, short clips selected from popular music, television programs and movies have enjoyed considerable success, which are often sold to users for a small fee. However, there are still problems with this arrangement, as oftentimes the portion of the clip is not exactly the portion of the media sought, having been preset to the start of the clip or some other predetermined but unwanted section. Alternatively, the user may already have a copy of the desired media, but no convenient way to use it as an alert, thus leaving the user frustrated in having to pay multiple times for the same media. Although video and audio editing tools are available for savvy computer users to extract a desired segment, the majority of users will not want to endure the hassle of obtaining, learning, and using the editing software, as well as transferring the media file between the device and the computer. Furthermore, the software may incur additional purchasing costs for the user and may not be compatible with certain digital rights management (DRM) encrypted files.

Accordingly, there is a need to overcome the drawbacks and deficiencies in the art by providing a way for users to configure and playback easily customizable alert media.

SUMMARY OF THE INVENTION

There are provided systems and methods for customizable playback of device alert media, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for customizable playback of alert media. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1A:
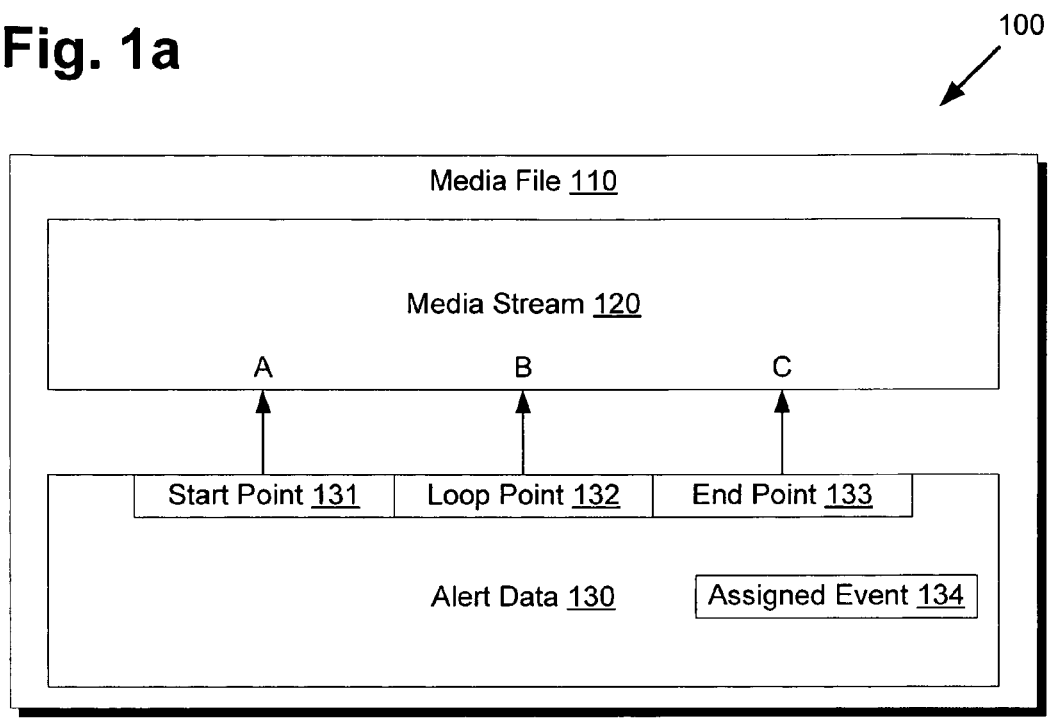
FIG. 1a presents a block diagram of a media file, according to one embodiment of the present invention.

FIG. 1a presents a block diagram of a media file, according to one embodiment of the present invention. Media file diagram 100 includes media file 110, which includes media stream 120 and alert data 130. Alert data 130 includes start point 131, loop point 132, end point 133, and assigned event 134. Start point 131, loop point 132, and end point 133 reference time offsets in media stream 120. Assigned event 134 represents the trigger where alert data 130 will be used. Although alert data 130 is shown embedded within media file 110, it could also exist in a separate file or within a database. Further, media stream 120 has a beginning and an end, and in one embodiment, at least one of start point 131 and end point 133 is different from the beginning and the end of media stream 120.

Media stream 120 is a digitized representation of an audio, video, or audio and video signal. Multiple concurrent audio streams might be used to embed dubbed languages or alternative versions of a song in a single file, for example. Multiple concurrent video streams might allow different camera angles, for example. Media stream 120 might also be compressed to conserve storage space and expedite network transfer time. Formats established by the Motion Picture Experts Group (MPEG) such as MPEG-1 Audio Layer 3 (MP3) for audio and H.264 for video might be used for compression purposes. Additional metadata might be included within media stream 120 such as tags identifying the title, artist, genre, date of release, and other information describing the media stream. These tags might be implemented using the ID3 tag format. The data might be further encapsulated in a container format such as MPEG-4 Part 14 (MP4) or Audio Video Interleave (AVI). Digital Rights Management (DRM) encryption might also be applied to manage and enforce access rules and restrictions to media file 110.

Alert data 130 includes metadata to allow customizable playback of media stream 120 in response to assigned event 134. Assigned event 134 may represent something requiring attention from a user, such as an incoming call, a message, or some other alert or alarm. Once a device storing media file 110 detects an occurrence of assigned event 134, the metadata is consulted to correctly playback media stream 120. The metadata includes a plurality of points designating time offsets within media stream 120, including start point 131, loop point 132, and end point 133, referencing time offsets A, B, and C, respectively. The time offsets might be specified in standard time measurements such as seconds and microseconds. In this fashion, two points can define the beginning and end of a particular time segment. Alternatively, low-level media-specific units of measure such as frames or samples may be used for more convenient data processing. When low-level units of measure are coupled with media resolution information such as frames or samples per second, the time offset can be readily converted to a user-friendly minutes and seconds time value.

Figure 1B:
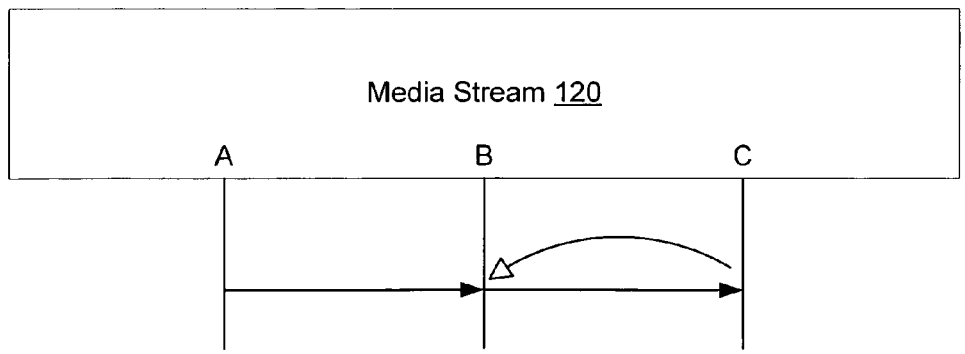
FIG. 1b presents a media stream of a media file, according to one embodiment of the present invention.

FIG. 1b presents a media stream of a media file, according to one embodiment of the present invention. FIG. 1b illustrates the intended usage of the start point, loop point, and end point during playback of the media stream. Playback begins at time offset A, continues until time offset B, and continues until time offset C. Depending on whether looping is desirable, playback may continue looping from time offset B to time offset C. If the original triggering event, assigned event 134, is an ongoing event such as an alarm or an incoming call, playback might continue to loop until the user expires the event by answering the call or silencing the alarm. On the other hand, if assigned event 134 is more of a notification and does not require the immediate attention of the user, playback may simply stop at the end of time offset C. Examples might include a new text message, a new e-mail, or a new voice mail.

Although FIG. 1b depicts time offsets A, B, and C as unique time offsets within media file 110, alternative embodiments may be configured differently. For example, if the user does not require an introductory playback segment from A to B, then time offsets A and B could be set to the same value. This effectively renders the segment from A to B empty, so it will be skipped. Similarly, if the user does not require looping functionality, time offsets B and C could be set to the same value. This effectively renders the segment from B to C empty, so that nothing will be looped.

Further, although the set of points can be configured flexibly, a few rules must be satisfied for playback validity. Time offset A, corresponding to the start point, should be earlier in time than time offset C, corresponding to the end point. Correspondingly, time offset C should also be later in time than time offset A. Time offset B, corresponding to the loop point, may point to any position inclusive within the segment defined from A to C, including time offsets A and C. In other words, if time offset A is later than time offset C, or if time offset B is later than time offset C or earlier than time offset A, then the set of points is invalid. Additionally, the degenerate case where time offsets A, B, and C are equal is meaningless and invalid, as it specifies nothing to playback.

Figure 2:
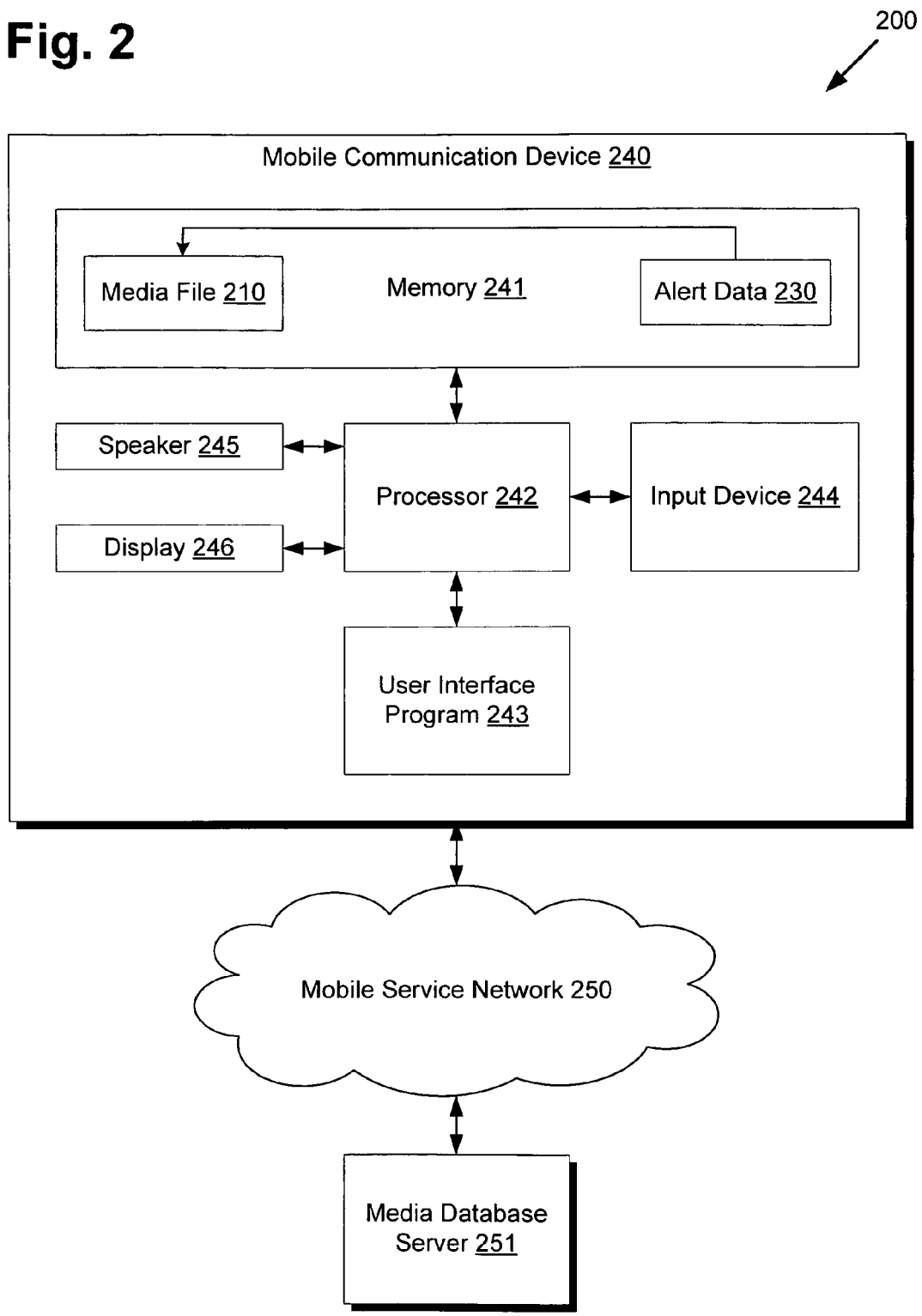
FIG. 2 presents a device for alerting a user of the occurrence of an event, according to one embodiment of the present invention.

FIG. 2 presents a device for alerting a user of the occurrence of an event, according to one embodiment of the present invention. Communication device environment 200 includes mobile communication device 240, mobile service network 250, and media database server 251. Mobile communication device 240 can communicate over mobile service network 250 to exchange data with media database server 251. Mobile communication device 240 further includes memory 241, processor 242, user interface program 243, input device 244, speaker 245, and display 246. Memory 241 includes media file 210 and alert data 230 referencing media file 210. Media file 210 corresponds to media file 110 from FIG. 1. Processor 242 is capable of accessing memory 241, input device 244, speaker 245, and display 246. User interface program 243 can be read for execution by processor 242, providing a user interface on display 246. Example user interfaces shall be detailed in FIG. 3 below, using input device 244 to receive inputs from the user. Speaker 245 and display 246 can be utilized for audio and video output to the user, respectively.

Although the device depicted in FIG. 2 is shown as a communications device, alternative devices that lack communications ability could be used as well. For example, an alarm clock might be preloaded with several popular songs and provide a user interface to allow the user to select a desired portion of a song to use as an alarm. However, for the purposes of the present example, a communications device shall be illustrated.

FIG. 2 also depicts media file 210 and alert data 230 as separate entities within memory 241, but alert data 230 could also be embedded within media file 210 as depicted in FIG. 1. Provided that alert data 230 is somewhere within memory 241, processor 242 can read alert data 230 and configure itself to respond to the appropriate event, whether an incoming call, a message, an alarm, or something else. That response, the customized media playback, will be discussed in detail with FIG. 4 below.

Figure 3A:
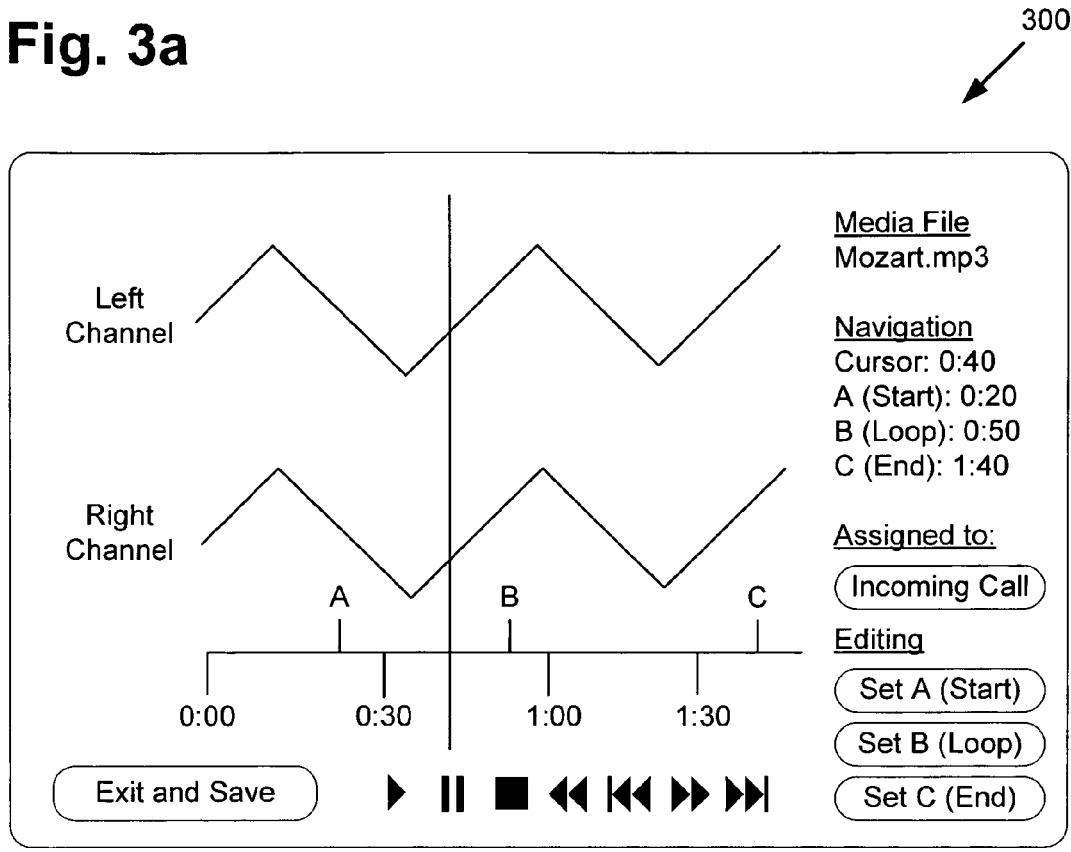
FIG. 3a presents a depiction of a user interface provided by a device for alerting a user of the occurrence of an event, in accordance with one embodiment of the present invention.

FIG. 3a presents a depiction of a user interface provided by a device for alerting a user of the occurrence of an event, in accordance with one embodiment of the present invention. Although FIG. 3a is directed towards an audio media embodiment with a waveform representation of the audio media, an alternative embodiment may be directed towards video media with video frame thumbnails, and another embodiment may be directed towards both audio and video media. In the audio and video media embodiment, customized media playback might be applied to the audio component and video component separately and independently, depending on user preference.

Returning to the embodiment shown in FIG. 3a, user interface 300 might be rendered using user interface program 243 executing on processor 242 to present an interface on display 246 of FIG. 2. Input device 244 might then be a touch sensitive panel on display 246, so that the user directly touches display 246 to interact. FIG. 3a illustrates a situation where a user is manually setting alert data. The user might select the desired media file, "Mozart.mp3" in this case, from a prior selection dialog. Additionally, the user may have selected "Incoming Call" as the assigned event. After settings these initial variables, the user may be given the option to manually set a playback range by using user interface 300.

To set a playback range, a user might push the "Set A (Start)" button and mark the A position with a finger tap, and proceed similarly with "Set B (Loop)" and "Set C (End)," adjusting the playback of the media file so that it begins and loops according to the user's preference. The playback controls at the bottom of the screen might be used to preview the current settings, letting the user fine-tune and adjust before committing. The user interface may enforce data validation by preventing the user from setting invalid points, or by automatically substituting default point positions if left unspecified by the user. For example, the interface may prevent point C from being placed before point A, if the user attempts to do so. If the user finishes by pushing "Exit and Save" without specifying point A, it might default to time 0:00, or be set equal to point B if specified. Similarly, if not specified, point B might default to equal point A, and point C might default to equal the end position of the media file. In FIG. 3*a*, the user has already chosen three valid points as shown under the navigation listing, with point A set to 0:20, point B set to 0:50, and point C set to 1:40. Once the user is satisfied with the point selections, the "Exit and Save" button may be pressed to commit the values.

Although FIG. 3*a* only shows one set of points for customized media playback, alternative embodiments may allow multiple sets of points for the same media file, allowing the user to setup and easily choose from multiple sections of the media file. Additionally, the user may be presented with the option to retrieve preset points through a centralized server or from other users via a network, or the preset points might be embedded within the media file in advance, avoiding the laborious process of manually selecting playback points. An example is described in conjunction with FIG. 3*b* below.

Figure 3B:
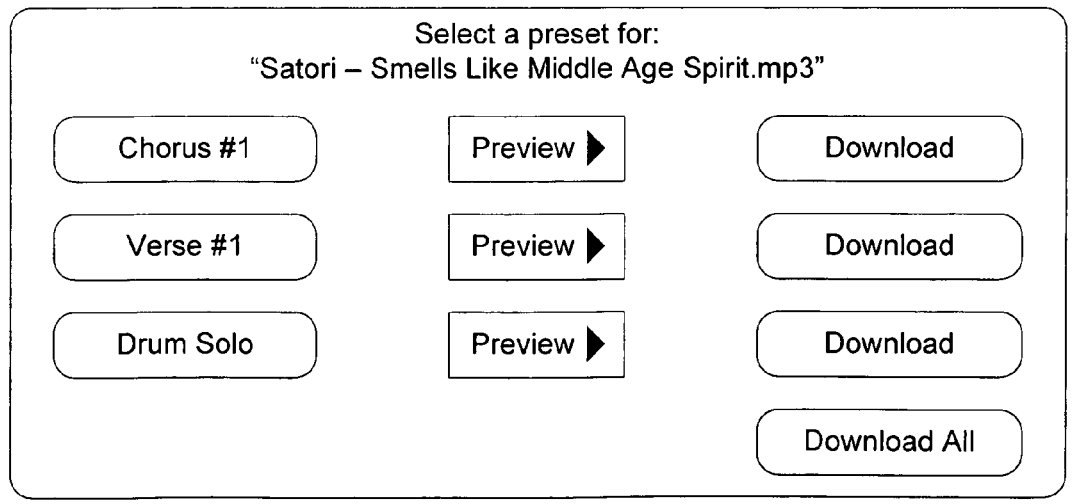
FIG. 3b presents a depiction of another user interface provided by a device for alerting a user of the occurrence of an event, in accordance with one embodiment of the present invention.

FIG. 3*b* presents a depiction of another user interface provided by a device for alerting a user of the occurrence of an event, in accordance with one embodiment of the present invention. A dialog box as shown in FIG. 3*b* might be presented to the user as an alternative to FIG. 3*a*, allowing a user to easily choose a preset of customized playback points for a properly cataloged or well known media file. For example, the user might have downloaded an MP3 audio file of the hit single "Smells Like Middle Age Spirit" from the popular alternative band "Satori." By communicating with media database server 251 via mobile service network 250 in FIG. 2, processor 242 may identify the audio or tag signature of the MP3 file and provide an appropriate list of presets available for the identified MP3 file. As shown in FIG. 3*b*, the presets "Chorus #1," "Verse #1," and "Drum Solo" are available to download, with previews available to confirm the selection is correct. Alternatively, the user might elect to download all available presets at once by selecting the "Download All" button, and decide which preset to use at a later time. These presets may have been professionally selected by the mobile service network provider, donated by fellow users, or detected through audio analysis algorithms. Alternatively, if media files are provided directly to the user rather than having to rely on existing media the user owns, then the presets can be embedded as metadata within the media file itself. The user can then simply choose a desired preset, bypassing manual selection of playback points.

A set of points, whether selected manually or by preset, is now configured for a particular media file and in response to a particular assigned event. To make a note of this for future reference, processor 242 may store the assigned event as part of the alert data as in FIG. 1, or it might be stored elsewhere within memory 241. Additionally, the alert data may be stored separately within memory 241 as in FIG. 2, or embedded within the particular media file as in FIG. 1. Once the alert data and assigned event are duly noted and stored by processor 242, it will be ready to alert the user of a future occurrence of the particular assigned event through customized playback of the particular media file. The steps for accomplishing this will be discussed further in conjunction with FIG. 4 below.

Figure 4:
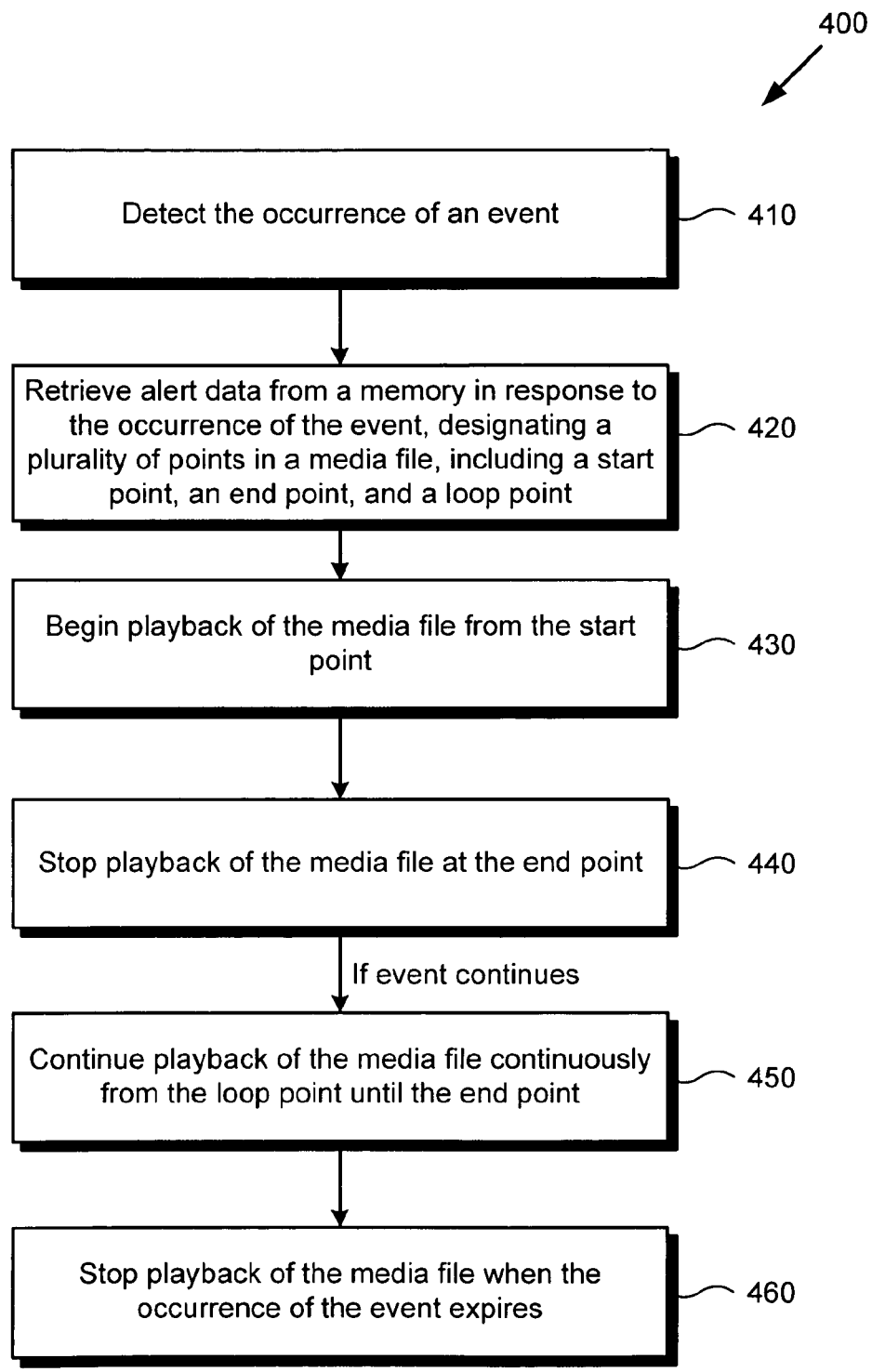
FIG. 4 shows a flowchart describing the steps, according to one embodiment of the present invention, by which a device can alert a user of an occurrence of an event.

FIG. 4 shows a flowchart describing the steps, according to one embodiment of the present invention, by which a device can alert a user of an occurrence of an event. Certain details and features have been left out of flowchart 400 that are apparent to a person of ordinary skill in the art. For example, a step may comprise one or more substeps or may involve specialized equipment or materials, as known in the art. While steps 410 through 460 indicated in flowchart 400 are sufficient to describe one embodiment of the present invention, other embodiments of the invention may utilize steps different from those shown in flowchart 400.

Referring to step 410 of flowchart 400 in FIG. 4 and media file diagram 100 of FIG. 1, step 410 of flowchart 400 comprises processor 242 detecting the occurrence of assigned event 134. Referring to FIG. 2, assigned event 134 will be retrieved from memory 241, stored as part of alert data 230 or elsewhere as discussed above. For example, using the settings depicted in FIG. 3*a*, processor 242 would be configured to detect an "Incoming Call" event, which will occur when somebody successfully calls the user's device.

Referring to step 420 of flowchart 400 in FIG. 4 and communication device environment 200 of FIG. 2, step 420 of flowchart 400 comprises processor 242 retrieving alert data 230 from memory 241 in response to step 410. As shown in FIG. 1, alert data 130 corresponding to alert data 230 contains start point 131, loop point 132, and end point 133, each point designating a particular position within a referenced media file. Since alert data 130 is embedded within media file 110, the media file is already self-referenced, but the alert data could also reference a separately stored media file as depicted in memory 241 of FIG. 2.

Referring to step 430 of flowchart 400 in FIG. 4 and communication device environment 200 of FIG. 2, step 430 of flowchart 400 comprises processor 242 beginning playback of media file 210 from start point 131 retrieved from step 420. Continuing with the example set by FIG. 3*a*, playback will begin at time position A, or 20 seconds past the beginning of the media file. Since the media file is an audio file, "Mozart.mp3," the digital representation of the audio may be converted to an analog sound wave for output through speaker 245. If mobile communication device 240 features a silent or vibration mode that is currently enabled, a vibration motor may be initiated instead, or display 246 might flash to alert the user. In an alternative embodiment, the media file might be a video file, in which case the video will be displayed on display 246. If the video file also includes audio, the audio may also be output to speaker 245, unless silent or vibration mode is engaged. Alternatively, the user may opt to use only the audio or video portion of a media file containing both audio and video, and each portion may have a different independent set of associated playback points, as previously discussed.

Referring to step 440 of flowchart 400 in FIG. 4 and communication device environment 200 of FIG. 2, step 440 of flowchart 400 comprises processor 242 stopping playback of media file 210 at end point 133 retrieved from step 420. Continuing with the FIG. 3*a* example, playback will continue from point A as initiated from step 430, and stop at point C, or 1 minute, 40 seconds past the beginning of the media file. As mentioned, the media file could contain a variety of data streams, but FIG. 3*a* depicts the audio-only file "Mozart.mp3." Thus, in conjunction with previous step 430, processor 242 will playback media file 210 from point A to C, outputting through speaker 245.

Referring to step 450 of flowchart 400 in FIG. 4 and communication device environment 200 of FIG. 2, step 450 of flowchart 400 comprises processor 242 continuing playback of media file 210 continuously from point B until point C, if the occurrence of assigned event 134 continues. If the nature of the event is instantaneous, such as a notification of a new message, the event will expire immediately after triggering and playback of media file 210 will end at step 440. However, a continuing event such as an unanswered incoming call or a triggered alarm may require mobile communication device 240 to continue alerting the user that some response is needed. In the example depicted by FIG. 3*a*, "Mozart.mp3" will continuously play from point B until point C, looping the time segment defined from 0:50 to 1:40. Processor 242 might additionally apply some mixing and processing effects during playback, such as applying a cross fading filter to smooth the loop transition.

Referring to step 460 of flowchart 400 in FIG. 4 and communication device environment 200 of FIG. 2, step 460 of flowchart 400 comprises processor 242 stopping playback of media file 210 when the occurrence of assigned event 134 expires. Continuing with the example set by FIG. 3a, this will occur when the incoming call expires. This might happen if the user answers the call by interacting with input device 244, if problems with mobile service network 250 cause the call to be prematurely dropped, or if processor 242 is configured to expire an incoming call automatically at a preset timeout period, such as after five loops of the media file, or after two minutes. When assigned event 134 expires, there is no longer a need to alert the user, and therefore processor 242 stops playback of media file 210.

As part of the advantages of various embodiments of the present invention, users are enabled to configure and playback easily customizable alert media on various devices. By selecting time points through a user interface on the device itself, or by selecting time point presets provided by a centralized server or fellow users, a user can easily customize the playback of a preexisting media file stored on the device, avoiding the need to double purchase the same media file simply to access the portion of the media file desired to be used as an alert media. Users thus avoid duplicitous media purchases, increasing their confidence in the flexibility of media content delivery systems and thus encouraging them to purchase more media files, resulting in benefits for content producers and service providers as well. Once a procedure only possible through a laborious editing process of questionable legality, the various embodiments of the present invention now enable any user, from beginner to expert, to easily customize their device alert media, even with media files that may be encrypted with DRM.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A device for alerting a user of an occurrence of a device event, the device comprising:
    a display;
    a memory configured to store alert data and a media stream;
    a processor configured to present a user interface on the display for the user of the device to select a plurality of points in the media stream, including a start point, an end point after the start point, and a loop point in between the start point and the end point, wherein at least one of the start point and the end point is different from the beginning and the end of the media stream;
    the memory further configured to store the plurality of points selected by the user of the device using the user interface;
    the processor further configured to:
        detect the occurrence of the device event;
        retrieve the alert data from the memory in response to the occurrence of the device event;
        begin playback of the media stream from the start point until the end point;
        continue, during the occurrence of the device event, the playback of the media stream continuously from the loop point until the end point; and
        stop playback of the media stream when the occurrence of the device event expires.

2. The device of claim 1, wherein the device event is one of an incoming call, a new text message, a new voicemail, or a new e-mail.

3. The device of claim 1, wherein the media stream is one of an audio stream or a video stream.

4. The device of claim 1, wherein the device comprises a communications device.

5. The device of claim 4, wherein the device is a mobile phone.

6. The device of claim 1, wherein each of the plurality of points designates a time offset within the media stream.

7. A method for use by a device to alert a user of an occurrence of a device event, the method comprising:
    presenting a user interface on a display of the device for the user of the device to select a plurality of points in the media stream, including a start point, an end point after the start point, and a loop point in between the start point and the end point, wherein at least one of the start point and the end point is different from the beginning and the end of the media stream;
    detecting the occurrence of the device event;
    beginning playback of the media stream from the start point until the end point;
    continuing, during the occurrence of the device event, the playback of the media stream continuously from the loop point until the end point; and
    stopping playback of the media stream when the occurrence of the device event expires.

8. The method of claim 7, wherein the device event is one of an incoming call; a new text message, a new voicemail, or a new e-mail.

9. The method of claim 7, wherein the media stream is one of an audio stream or video stream.

10. The method of claim 7, wherein the device is a mobile phone.

11. The method of claim 7, wherein each of the plurality of points designates a time offset within the media stream.

* * * * *